United States Patent [19]

Ernst et al.

[11] 4,204,717

[45] May 27, 1980

[54] BALL BEARING WITH RADIAL APERTURES IN END RINGS

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 908,927

[22] Filed: May 24, 1978

[30] Foreign Application Priority Data

Jun. 4, 1977 [DE] Fed. Rep. of Germany ....... 2725355

[51] Int. Cl.² ............................................. F16C 31/06
[52] U.S. Cl. ................................................... 308/6 C
[58] Field of Search ............................... 308/6 R, 6 C

[56] References Cited

U.S. PATENT DOCUMENTS

| | | | |
|---|---|---|---|
| 3,265,449 | 8/1966 | Jahn | 308/6 C |
| 4,123,121 | 10/1978 | Ernst et al. | 308/6 C |

FOREIGN PATENT DOCUMENTS 2558195  7/1976  Fed. Rep. of Germany .......... 308/6 C Primary Examiner—Charles E. Frankfort
Attorney, Agent, or Firm—Daniel M. Rosen

[57] ABSTRACT

In a linear motion ball bearing having a cylindrical cage guiding endless rows of balls, an outer sleeve around the cage, and end rings overlying and defining with the ends of the cage reversing or turn-around zones for the balls, each end ring further defining therein a slot, formed as a crescent for example, extending radially through the wall of the end ring and overlying the turn-around zone, the slot width being less than the diameter of the balls, whereby the slot permits the balls to be positioned substantially outward radially, and partially in while not falling through the slot.

7 Claims, 6 Drawing Figures

BALL BEARING WITH RADIAL APERTURES IN END RINGS

BACKGROUND OF THE INVENTION

The present invention relates to a ball bearing consisting of an outer sleeve with races extending axially in the bore, a cage with a plurality of ball guides distributed over the periphery and formed by axially extending guide races for the loaded and unloaded balls, respectively, and by semicircular reversing races interconnecting the guide races in pairs, and with endless rows of balls disposed in these ball guides. The bore of the outer sleeve is provided with axially extending races and return races for the balls, these races having a width corresponding approximately to the width of the axially extending guide-race sections in the cage. The cage is made of plastic and projects with the semicircular reversing races beyond the outer sleeve, and end rings made of plastic, for example, are set onto the projecting sections of the cage to cover the reversing zone. In this reversing zone the reversing races in the cage have a bottom part extending convexly in the peripheral direction and each of the end rings is provided with a convex depression situated radially over the reversing races, the convexity of the bottom of the reversing races in the cage having a radius of curvature whose center, together with the center of the radius of curvature of the cross section of the respective depression of the end ring, lies on a common center-point axis extending parallel to the axis of the bearing, in accordance with U.S. patent application Ser. No. 884,190 filed Mar. 18, 1977 and U.S. Pat. No. 4,123,121.

The object of the present invention is to provide a ball bearing that is an improvement over the relevant prior art. The components of the new bearing can be produced more simply and more economically and assembled more easily, and are less subject to wear particularly in the reversing zones than corresponding parts in the prior art. Also the new bearing is quieter in operation and more resilient at the ends with respect to shaft deflections.

The invention of the above-noted application having Ser. No. 884,190 has as an object to make possible improved, more economical manufacture, however this bearing has a particularly small overall radial height. If we reduce considerably radial dimensions of the end rings in this prior design, then the wall at the vertex of the reversing zone becomes so thin that it can easily break out. Such breaking out between the balls will impede the smooth operation of the bearing. Similarly, when the wall thickness of the cage is reduced, there is the danger that the island portions, which in the vicinity of the reversing races are joined in one piece to the lateral sections of the cage, may break off.

It is the object of the present invention to improve the subject matter of the above-noted prior art in such a way, that the overall radial height can be reduced without deleterious consequences. Moreover, it is sought to make the subject bearing relatively rugged and insensitive to high loads and stresses in operation.

SUMMARY OF THE INVENTION

In accordance with the invention and to accomplish the above objects, the end rings are provided over every semicircular reversing race, at least at the vertex of the convex depression, with an opening which extends radially outwardly and whose edges cover one or both sides of the respective reversing race. In this way, the balls may be arranged relatively far outward radially at the vertex of the reversing zone without there being over this vertex of the reversing zone, an easily breakable thin wall of the respective end ring. At the same time the wall of the cage is rather thick in that same area of the reversing zone; thus the island portion of the cage, which is located in the center of each row of balls and which via that wall is joined in one piece to and held by the respective lateral section of the cage, is able to withstand even considerable loading in operation without being damaged by overloading.

In accordance with a special characteristic of the invention, the opening in the end ring is formed by a kidney-shaped slot in the wall thereof. In accordance with another embodiment, the opening in the end ring is formed by a substantially semicircular notch on the face of the end ring and directed axially inwardly.

BRIEF DESCRIPTION OF THE FIGURES

The ball bearing in accordance with the invention is explained below in terms of two embodiments with reference to the accompanying drawings.

DETAILED DESCRIPTION OF THE PREFERRED EMBODIMENT

Figure 1:
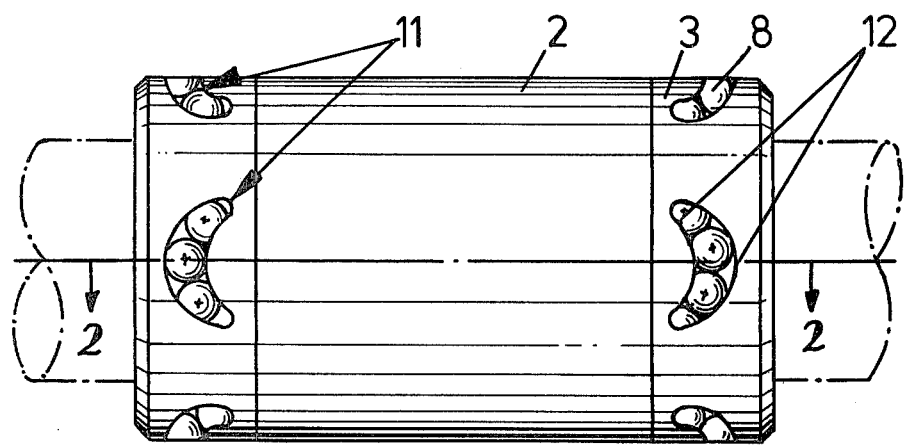
FIG. 1 is a plan view of a ball bearing with kidney-shaped slots in the end rings.
Figure 2:
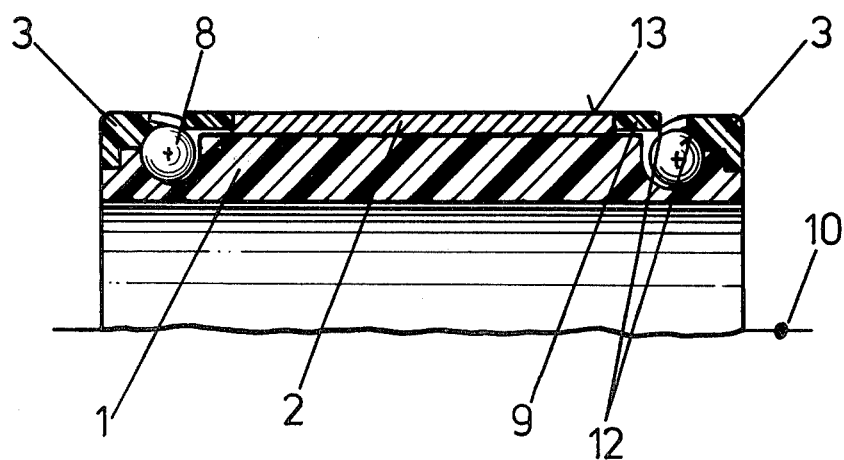
FIG. 2 is a longitudinal section through the ball bearing shown in FIG. 1, taken along the line 2—2.

In FIGS. 1 and 2 there is shown the new ball bearing formed by outer sleeve 2, a cage 1, and end rings 3. The cage 1 is set into the bore of the outer sleeve 2, and each end ring 3 is set onto each end of the cage 1 and rigidly joined to it by welding or bonding, for example. As is apparent particularly from FIG. 3, the cage 1 has a plurality of ball guides which are distributed over the periphery. Each ball guide includes (a) an axially extending, inwardly open guide race 4 for the loaded balls, (b) a return guide race 5 which extends parallel to race 4, and also is inwardly open, for the unloaded balls; and (c) reversing races 7 which connect the two guide races and have a bottom 6 which extends convexly in the peripheral direction. Each ball guide accommodates an endless row of balls 8.

Figure 6:
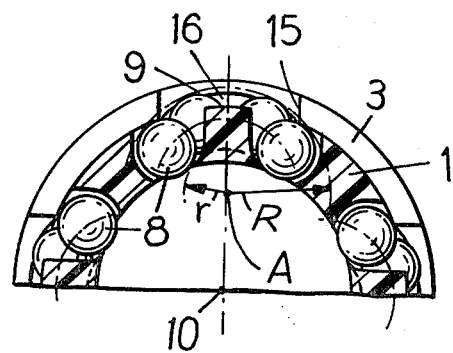
FIG. 6 is a cross-sectional view taken along line 6—6 in FIG. 5.

In the vicinity of the reversing or turn-around races 7, the end rings 3 have a cylindrical depression or recess 9 open axially inwardly. The center of the radius of curvature R of the cross section of this concave recess 9 lies, together with the center of the radius of curvature r of the bottom 6 of the reversing races 7 in the peripheral direction, on a center-point axis A extending parallel to the axis 10 of the ball bearing, in the manner shown in FIG. 6.

Moreover, over every semicircular reversing race or turn-around zone 7 there is disposed in the wall of the end rings 3 a kidney-shaped or crescent shaped slot 11 extending nearly semicircularly, the width of the slot 11 being less than the diameter of the balls 8. 8, and the edges 12 of the slot 11 outwardly covering both sides of the respective reversing race 7 of the cage 1. At the vertex of the convex recess 9, the respective ball in its circulation in the ball bearing engages the slot 11 and there the ball is guided and prevented from dropping out by the two edges 12 of the slot 11. The ball 8 runs on the convex bottom 6 of the reversing race 7 and reaches the direct vicinity of the cylindrical circumference 13 of the ball bearing without there being any need for providing a thin, fragile wall at the vertex of the depression 9 of the ring 3. At the same time, the bottom 6 of the reversing race 7 forms an advantageously rigid connection between each island portion 14 of the cage 1 (see FIG. 3) and the two lateral portions 17 of the cage since the latter can be made sufficiently thick in the radial direction.

Figure 3:
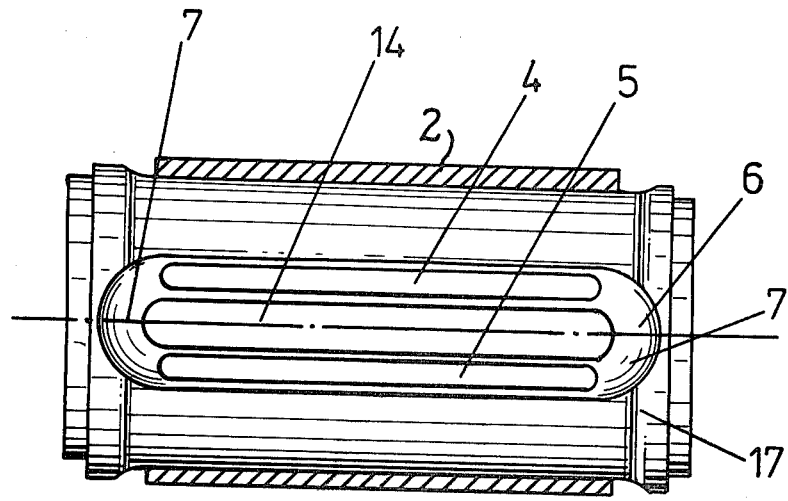
FIG. 3 is a plan view of the cage of the ball bearing shown in FIG. 1.
Figure 4:
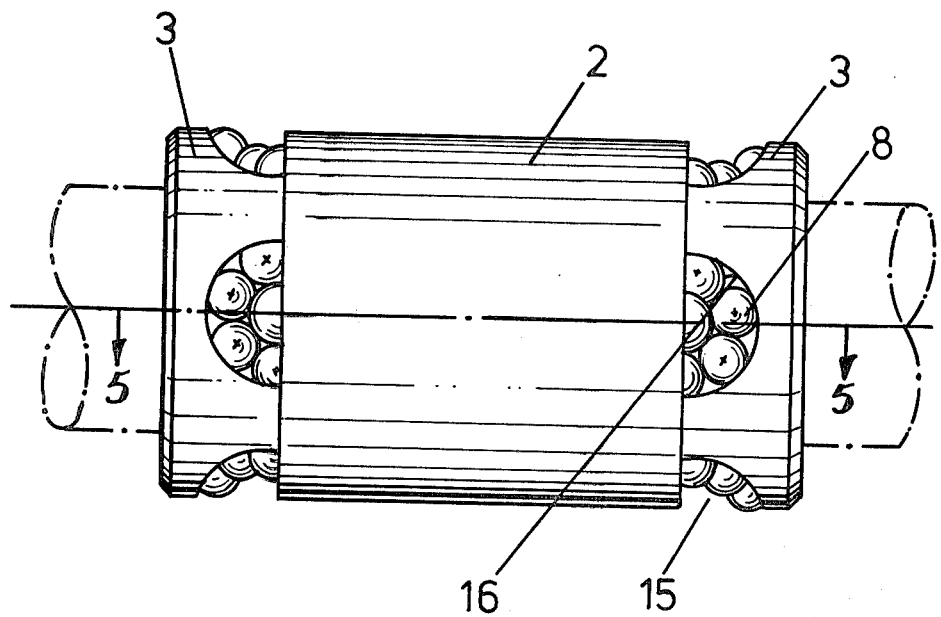
FIG. 4 is a plan view of a modified ball bearing having semicircular notches in the end rings.
Figure 5:
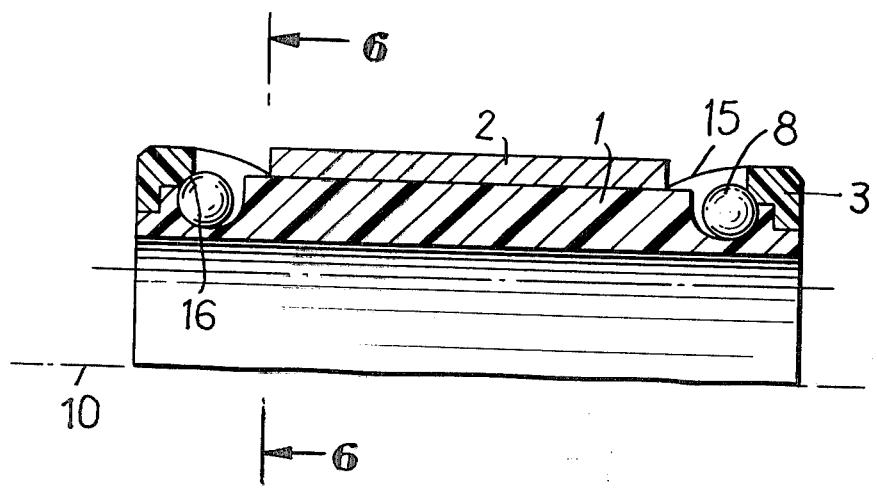
FIG. 5 is a longitudinal section through the ball bearing shown in FIG. 4, taken along the line 5—5.

Shown in FIGS. 4 and 5 is a modified ball bearing which is constructed similarly to the ball bearing illustrated by FIGS. 1, 2 and 3, but in place of the kidney-shaped slots has semicircular notches 15 in the face of the end rings 3 and directed axially inwardly. Every notch 15 forms the edge 16 which is radially outward of and covers the respective reversing race 7 along its outer side. In this way, the balls 8 are prevented from dropping out of the ball bearing. At the same time, the balls in their circulating movement during operation are advantageously closely guided by the edge 16 of the notch 15.

During their circulation in the bearing, the balls 8, run on the bottom 6 of the reversing race 7 and at the vertex of the convex recess 9, and engage the respective notch 15 in the end rings 3 so that the balls 8 come to be located relatively far outward radially in their reversing race 7, and accordingly a relatively strong connection is provided between the island portions 14 and the lateral portions 17 of the cage 1.

The great advantage of the ball bearing in accordance with the invention, lies in the fact that an extremely small radial overall height of the bearing is achieved even though it is of rugged construction.

What is claimed is:

1. In a linear motion ball bearing for movement along a shaft, the bearing including an outer sleeve with races extending axially in the bore, a cylindrical ball guide within the outer sleeve, a plurality of endless raceways at least partially defined by said sleeve and ball guide and substantially filled with balls, each endless raceway including a pair of axial loaded and non-loaded return zones and curved turn-around zones connecting the ends of the axial zones, and end rings secured at the ends of the sleeve and ball guide and overlying the turn-around zones, the improvement in combination therewith, wherein each turn-around zone is defined by a convex surface of the ball guide extending radially outward, and a corresponding concave surface of said end ring spaced radially outward of said convex surface, said convex and concave surfaces having radii of curvature whose centers lie on a common center-point axis extending parallel to the axis of the bearing, and wherein each of said end rings includes radially extending apertures therethrough, each aperture defined by edges which at least partially overlie one of said turn-around zones and which prevent balls from falling out of said turnaround zones.

2. A ball bearing according to claim 1, wherein each of said apertures defines a crescent shape overlying a turn-around zone.

3. A ball bearing according to claim 1, wherein said turn-around zones are generally semicircular and each of said apertures has a corresponding generally semicircular shape overlying a turn-around zone.

4. A ball bearing according to claim 1, wherein said turn-around zone portions of the ball guide are situated axially outward of said outer sleeve, and said end rings which overlie said turn-around zones are secured at the ends of said outer sleeve.

5. A bearing according to claim 1, wherein said ball guide defines for each pair of axial loaded and non-loaded zones a pair of slots which extend axially and radially through said ball guide permitting the balls in both loaded and non-loaded zones to contact the shaft.

6. A bearing according to claim 1, wherein said outer sleeve is relatively thin in the radial direction, and said end rings also are relatively thin in the radial direction in the vicinity of said turn-around zones.

7. In a linear motion ball bearing for movement along a shaft, the bearing including an outer sleeve with races extending axially in the bore, a cylindrical ball guide within the outer sleeve, a plurality of endless raceways at least partially defined by said sleeve and ball guide and substantially filled with balls, each endless raceway including a pair of axial loaded and non-loaded return zones and curved turn-around zones connecting the ends of the axial zones, and an end portion at each end of the sleeve and ball guide overlying a turn-around zone, the improvement in combination therewith, wherein each turn-around zone is defined by a convex surface of the ball guide extending radially outward, and a corresponding concave surface of said end ring spaced radially outward of said convex surface, said convex and concave surfaces having radii of curvature whose centers lie on a common center-point axis extending parallel to the axis of the bearing, and wherein each of said end portions includes radially extending apertures therethrough, each aperture defined by edges which at least partially overlie a turn-around zone, whereby balls in each turn-around zone contact said edges but cannot fall through the aperture.

* * * * *

UNITED STATES PATENT AND TRADEMARK OFFICE
CERTIFICATE OF CORRECTION

PATENT NO. : 4,204,717
DATED : May 27, 1980
INVENTOR(S) : HORST M. ERNST, ET AL

It is certified that error appears in the above—identified patent and that said Letters Patent is hereby corrected as shown below:

Column 2, line 68, omit "8.".

Column 3, line 29, omit "8,".

Signed and Sealed this

Twentieth Day of October 1981

[SEAL]

Attest:

GERALD J. MOSSINGHOFF

Attesting Officer   Commissioner of Patents and Trademarks